United States Patent Office 3,613,484
Patented Oct. 19, 1971

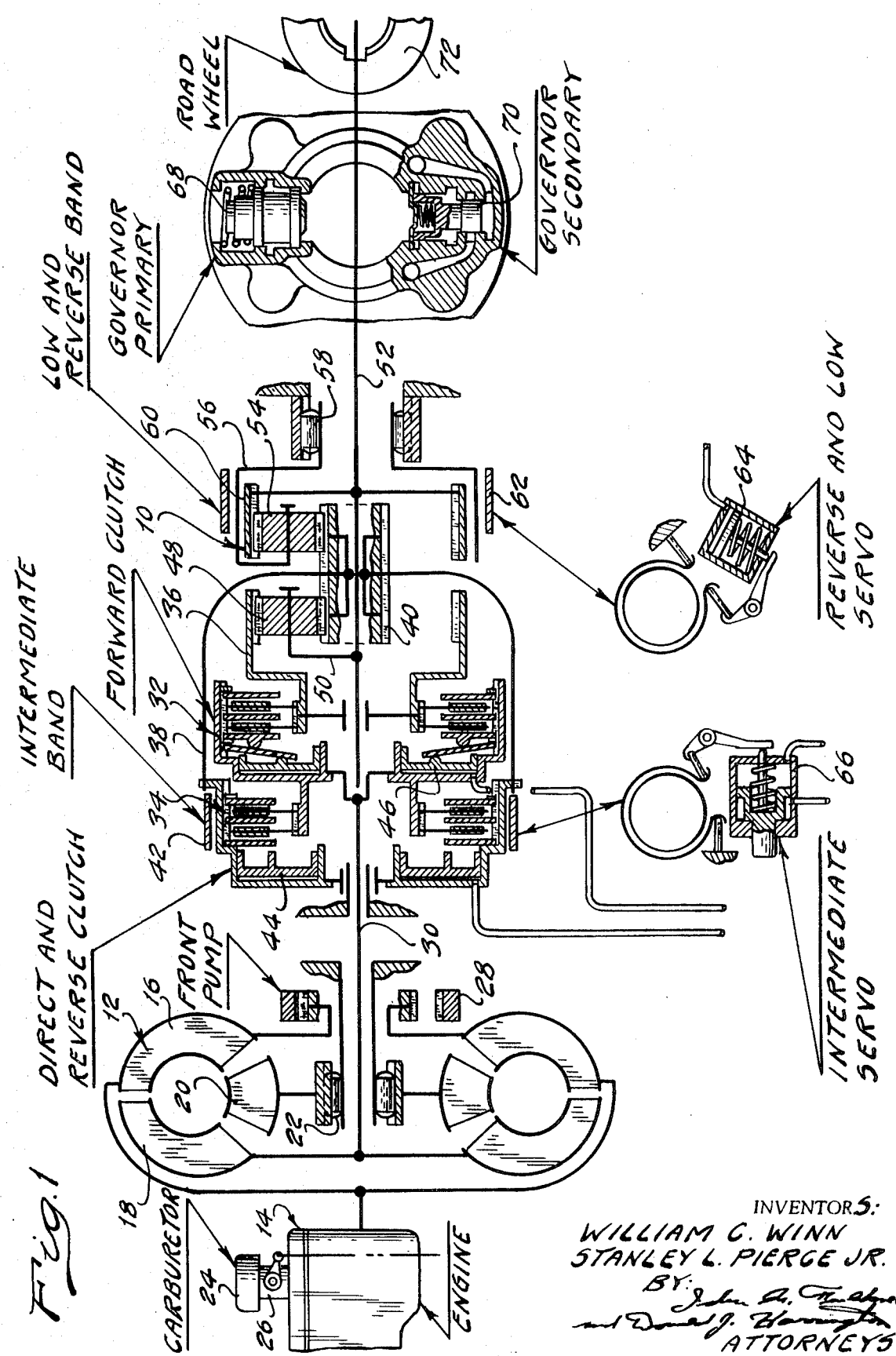

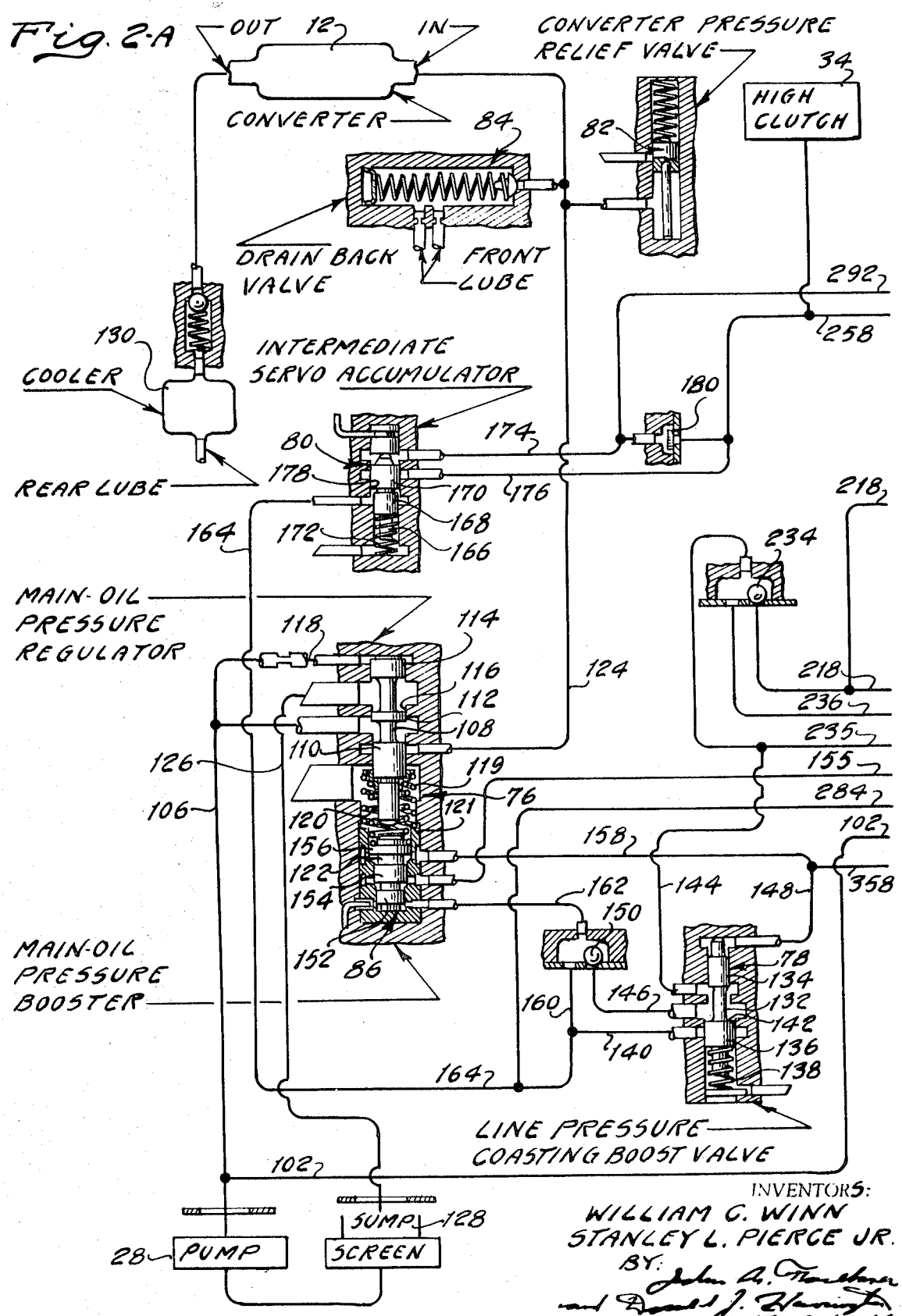

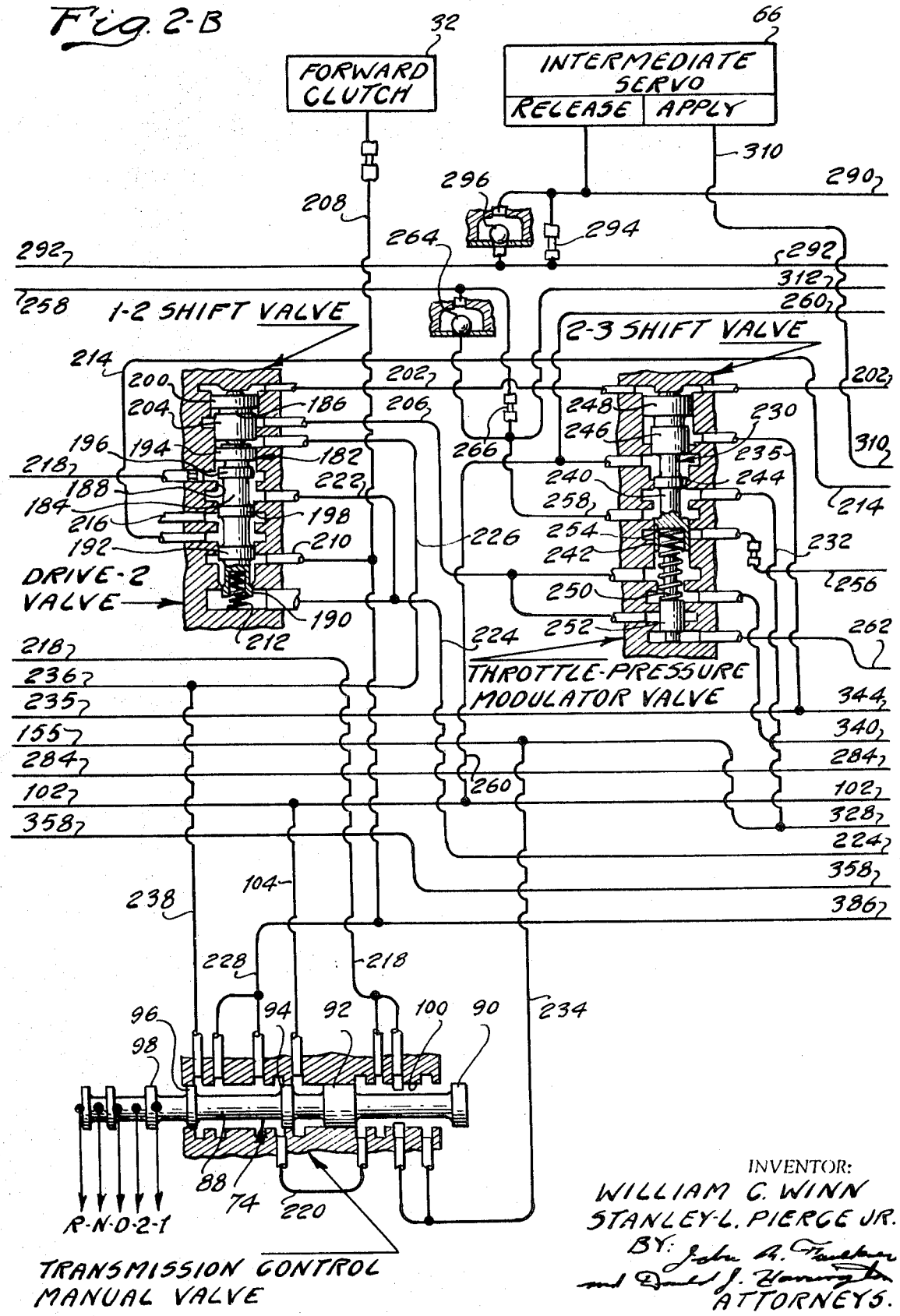

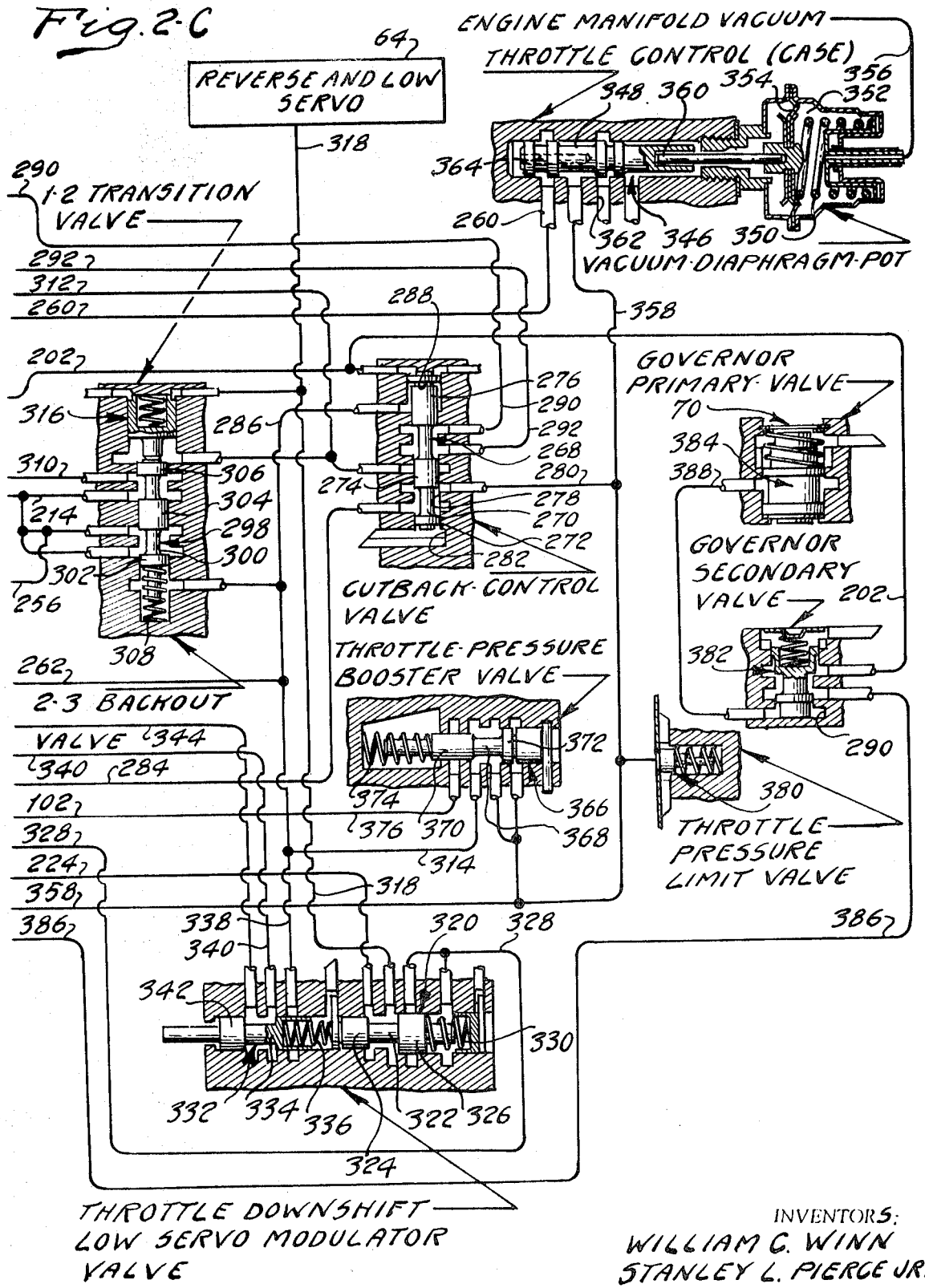

3,613,484
RATIO SHIFT TIMING VALVES FOR USE IN A CONTROL SYSTEM FOR A MULTIPLE RATIO AUTOMATIC POWER TRANSMISSION MECHANISM
Stanley L. Pierce, Birmingham, and William C. Winn, Inkster, Mich., assignors to Ford Motor Company, Dearborn, Mich.
Filed Dec. 8, 1969, Ser. No. 883,061
Int. Cl. B60k 21/10
U.S. Cl. 74—869
10 Claims

ABSTRACT OF THE DISCLOSURE

A control valve system for controlling ratio shifts in a multiple ratio power transmission mechanism in an automotive vehicle driveline having fluid pressure operated clutch and brake servos for controlling ratio shifts, said system comprising a valve assembly for controlling the rate of engagement of one servo during a ratio change from the lowest speed ratio to an intermediate speed ratio and for controlling the clutch and brake engagement and release pattern when a down shift from the high speed ratio to an intermediate speed ratio occurs in response to increased torque demand at low vehicle speeds, and a separate valve assembly for controlling corresponding torque demand downshifts when the vehicle is operated in a relatively high speed range.

GENERAL DESCRIPTION OF THE INVENTION

Our invention comprises improvements in a control valve system for a multiple-ratio, automatic, power transmission mechanism for an automotive vehicle having an internal combustion engine. The transmission mechanism includes planetary gear elements that establish multiple torque delivery paths between the crankshaft of the engine and the driveshaft, which in turn is connected to the vehicle traction wheels through a suitable axle and differential mechanism.

The relative motion of the planetary gear elements is controlled by clutch and brake servos. They are energized with the pressure developed by an engine driven pump. Fluid circuitry, which includes the valve elements of our invention, establishes a fluid connection between the pump and the servos. The circuitry includes also a pair of shift valves, one of which controls ratio changes between the low speed ratio and an intermediate speed ratio and the second of which controls ratio changes between the intermediate speed ratio and the high speed driving ratio. The shift valves in turn are responsive to pressure signals, one of which is proportional to the driven speed of the mechanism and the other of which is proportional to the engine intake manifold pressure, an indicator of engine torque for any given speed and engine throttle setting.

The lowest speed ratio is obtained by anchoring a first reaction member in the planetary gearing, and a second or intermediate speed ratio is achieved by anchoring a second reaction member. The second reaction member is drivably connected to a brake drum about which is positioned an intermediate speed ratio brake band that is applied and released by a fluid pressure operated servo. The servo includes two working chambers, one being pressurized to establish brake engagement and the other being pressurized to release the brake. When both chambers are applied, the brake servo is released because the fluid pressure working area on the release side of the servo is greater than the corresponding area on the apply side.

Upon intermediate speed ratio brake application, the pressure movable piston of the servo is moved under the influence of pressure in the brake apply chamber as the fluid on the release side of the servo is exhausted or displaced. Timing of the application of the servo thus can be achieved by controlling the rate of exhaust of fluid from the release side of the servo as the apply side of the servo becomes pressurized during a ratio shift interval.

The circuit pressure which is made available to the servos is controlled by a pressure regulator valve system. Because the torque transmitted through the drive system changes during acceleration, it is desirable to cause the circuit pressure to vary accordingly. An optimum pressure may be maintained by simply calibrating the pressure regulator valve system to cause an effective circuit pressure that is sufficient to maintain the necessary clutch or brake torque capacity but which will not excessively pressurize the servos to a value that will be detrimental to the ratio shift quality. Pressure regulation is needed because a torque variation upon acceleration occurs, and this is due in part to the characteristics of the hydraulic torque converter which forms part of the power transmission mechanism. The torque converter multiplies engine torque delivered to the engine crankshaft before it is distributed to the power input element of the planetary gearing. The torque multiplication that is developed hydrokinetically by the torque converter, however, decreases as the vehicle accelerates and the torque converter approaches its coupling condition.

In order to modify the regulated circuit pressure, a so-called cut-back control valve is introduced into the regulating valve system. This valve is sensitive to the vehicle speed signal and causes a change in the effective pressure balance acting on the pressure sensitive portions of the regulator valve when the vehicle speed reaches a value greater than a predetermined value for any given engine throttle setting.

In the particular embodiment described in this specification, the cut-back control valve is effective to deliver a primary throttle valve pressure, which is an indicator of engine manifold pressure, to the main regulator valve element of the regulator valve system, thereby causing an auxiliary pressure force on the regulator valve system which modifies its regulating characteristics. When the vehicle speed exceeds a predetermined value, the mode of distribution of that throttle pressure to the main pressure regulating portions of the valve system is changed, thereby allowing an increase in the regulated pressure maintained by the valve system.

According to one of the improved features of our invention, the cut-back control valve mechanism controls the fluid flow path followed by the fluid pressure on the release side of the intermediate servo. When the cut-back control valve is in its low speed position, it establishes a bypass flow path around a precalibrated flow restricting orifice situated in the flow path for the release side of the servo, thereby rendering the flow restricting orifice ineffective to modify the rate of application of the intermediate speed ratio brake. At that time, however, an intermediate servo accumulator valve situated in the circuitry in fluid communication with the release side of the intermediate servo does control the rate of release of the fluid so that the application of the intermediate speed ratio brake will be delayed to produce a desired degree of overlap between the disengagement of the high speed ratio clutch and the intermediate speed ratio brake. The high speed ratio clutch is in fluid communication with the apply side of the intermediate speed ratio brake so that both can be pressurized and exhausted by the common shift valve. The intermediate servo accumulator is calibrated, however, to avoid an excessive overlap which would result in undesirable inertia forces and an undesirable roughness in the downshift from high ratio to the intermediate ratio.

When the cut-back control valve assumes its high speed position, it is effective to block the previously described bypass passage, thereby forcing the fluid on the release side of the intermediate speed ratio brake to pass through a calibrated orifice which delays the release of the intermediate speed ratio brake as the high speed ratio clutch becomes released. This will permit the high speed ratio clutch to slip, thereby allowing the engine to accelerate. Prior to application of the intermediate speed ratio brake, the acceleration occurs over a predetermined interval so that the engine driven portions of the system rotate in synchronism with the planetary gear elements that form the torque delivery path during operation in the intermediate ratio. This synchronism contributes to smoothness in the ratio shift from the high speed ratio to the intermediate speed ratio upon an increase in torque delivery at high vehicle speeds. The orifice can be calibrated to establish the optimum shift quality at such high speeds without reference to the performance and timing requirements for a corresponding shift at lower speeds when the cut-back control valve is in its low speed position.

The intermediate servo accumulator has the additional function of controlling the timing of a ratio change from the low speed ratio to the intermediate speed ratio as the intermediate brake becomes applied. This function is in addition to its function as a timing valve during torque delivery downshifts from the high speed ratio to the intermediate servo ratio at low speeds. The intermediate servo accumulator valve has no influence, however, on a torque delivery downshift from the high speed ratio to the intermediate speed ratio at higher speeds when the cutback control valve is in its high speed position. Thus the intermediate servo accumulator valve can be appropriately calibrated to meet the timing requirements during ratio changes at low speeds without reference to the timing requirements that exist during operation at higher speeds.

BRIEF DESCRIPTION OF THE FIGURES OF THE DRAWING

FIG. 1 shows a schematic view of the torque delivery elements which are controlled by the improved valve system of our invention.

FIGS. 2, 2A and 2B show in schematic form the valve elements of our improved control system.

PARTICULAR DESCRIPTION OF THE INVENTION

In FIG. 1, reference character 10 designates generally the planetary gear elements of a power transmission mechanism for an automotive vehicle driveline. Numeral 12 indicates a hydrokinetic torque converter and reference character 14 indicates an internal combustion engine.

Converter 12 includes a bladed impeller 16, a bladed turbine 18 and a bladed stator 20. The stator is situated between the flow exit region of the turbine and the flow entrance region of the impeller. All of the bladed members of the converter are situated in toroidal fluid flow relationship. Stator 20 is anchored against rotation in one direction by an overrunning brake 22, which accommodates free-wheeling motion in the direction of the rotation of the impeller but prevents rotation of the stator in the opposite direction. Impeller 12 is drivably connected to the crankshaft of the engine 14.

Engine 14 includes an air-fuel mixture carburetor 24 which supplies a combustible fuel mixture to engine intake manifold 26. The manifold pressure is distributed to the actuator for a transmission throttle valve, as will be explained with reference to FIG. 2B.

The impeller is connected drivably to the power input element of a positive displacement pump 28. It serves as a pressure source for the control system to be described with reference to FIGS. 2, 2A and 2B.

The torque converter 12 multiples the torque delivered by the internal combustion engine 14. The multiplied torque is distributed by the turbine 18 to turbine shaft 30, which is connected to the power input portion of a forward drive clutch 32 and to the power input portion of a direct-and-reverse clutch 34. Clutch 32 is adapted to connect drivably the turbine shaft 30 and ring gear 36 of the planetary gear system 10. Clutch 34 is adapted to connect selectively turbine shaft 30 with a drive shell 38, which in turn is connected to sun gear 40 of the planetary gear system 10. An intermediate speed ratio brake band 42 surrounds a drum portion of the clutch 34 and is adapted to anchor the sun gear 40 when it is applied. Clutch 34 is applied and released by a fluid pressure operated servo which includes a pressure operated annular piston 44 slidably situated in an annular cylinder. The clutch 32 is applied and released by a fluid pressure operated piston 46 which forms a part of a servo that includes also an annular cylinder connected to the turbine shaft 30.

The gear system 10 includes planetary pinions 48 which engage drivably the ring gear 36 and the sun gear 40. The pinions 48 are journaled rotatably on carrier 50 which is connected directly to power output shaft 52.

Sun gear 40 meshes also with planetary pistons 54 which are journaled on carrier 56. An overrunning brake 58 anchors the carrier 56 against rotation in one direction, but it permits freewheeling motion thereof in the opposite direction. Pinions 54 engage drivably ring gear 60 which is connected directly to the power output shaft 52.

The carrier 56 defines a brake drum about which is positioned brake band 62. This brake band can be applied and release selectively by a fluid pressure operated servo 64, which includes a single-acting fluid pressure operated piston effective to move the operating end of the brake band 62. The corresponding servo for the brake band 42 is shown at 66. It includes a movable piston and a cooperating cylinder which define opposed fluid pressure working chambers. When one chamber is pressurized, the servo applies the brake band. When the other is pressurized, the brake band is released. When both chambers are pressurized, the brake is still released since the effective working area on the release side of the piston is greater than the effective working area on the apply side thereof.

A compound governor valve assembly is connected drivably to the power output shaft 52. It includes a primary governor valve 68 and a secondary governor valve 70, the functioning of the latter being influenced by the action of the former so that the output pressure signal is inhibited or interrupted at low vehicle speeds although a useful pressure signal proportional in magnitude to the driven speed of the shaft 52 is developed at speeds greater than a predetermined speed. Shaft 52 is connected drivably to the road wheels schematically indicated at 72.

To condition the mechanism shown in FIG. 1 for operation in a low speed ratio, the forward clutch 32 is applied. This clutch remains applied during operation in each of the forward driving ratios. If engine braking is desired during coasting operation, or if continuous operation in the low speed ratio is desired, brake band 62 is applied. On the other hand, if the mechanism is conditioned for automatic speed ratio upshifts during the acceleration period, brake band 62 remains released and the reaction torque for the gear system 10 is distributed to the housing through overrunning brake 58. During low speed ratio operation, turbine torque developed by the turbine 18 is distributed through the engaged clutch 32 to the ring gear 36. Since the carrier 50 is connected directly to the power output shaft 52, rotation of the carrier is resisted. This causes reverse rotation of the sun gear 40. This reverse motion causes a positive or forward driving torque to be developed in ring gear 60, which is distributed to the power output shaft 52 to complement the torque distributed to power output shaft 52 through the carrier 50. A split torque delivery path thus is established as the carrier 56 acts as a reaction point for the gear system 10.

Intermediate speed ratio operation is achieved by engaging the clutch 32 and applying the brake band 42. This is done by supplying fluid pressure to the apply side of the intermediate servo 66. Sun gear 40 now becomes anchored so that it may function as a reaction point. Since the clutch 32 remains applied, the turbine torque is distributed to the ring gear 36 and the carrier 50 acts as a power output element. Overrunning brake 58 permits freewheeling motion of the carrier 56 at this time.

To condition the mechanism for operation in the third or high speed forward driving ratio, brake band 42 is released by introducing fluid pressure to the release side of the servo 66. This causes the piston of the servo 66 to stroke to its release position, thereby exhausting fluid from the apply side of the servo. At the same time the direct-and-reverse clutch 34 is applied. With both clutches thus applied, the elements of the planetary gear system are locked-up for rotation in unison thereby establishing a one-to-one driving ratio as torque is distributed from the turbine shaft 30 to the power output shaft 52.

To establish reverse drive operation, brake band 62 is applied by introducing fluid pressure to the servo 64. This causes the piston for the servo 64 to stroke to the brake applying position. The direct-and-reverse clutch 34 is applied. The intermediate servo is release and the forward clutch 32 is released. Turbine torque delivered by the converter is distributed from shaft 30 through the engaged clutch 34, through the drive shell 38 to the sun gear 40. Since the carrier 56 acts as a reaction member, ring gear 60 and output shaft 52 are driven in a direction opposite to the direction of rotation of the sun gear 40.

In FIG. 2 there is a manual control valve 74. This valve in adapted to select any one of several driving modes, including a multiple-ratio automatic driving mode wherein ratio changes during acceleration occur automatically. The position of the valve, when it assumes that operating mode, is shown at D. The position that the valve assumes for reverse drive is shown at R. If continuous operation in the lowest speed ratio is desired, the manaul valve 74 is shifted to the position L. If continuous operation in the intermediate speed ratio is desired with no automatic upshifts or downshifts, the manual valve is shifted to the intermediate position No. 2. Position N for the manual valve indicates a neutral position.

Other elements of the control circuit shown in FIG. 2 are the main pressure regulator valve 76, line pressure coasting boost valve 78, the intermediate servo accumulator valve 80, the converter pressure relief valve 82 and the converter drain back valve 84. Associated with the main oil pressure regulator valve is a main oil pressure booster 86.

Manual valve 74 includes a multiple land valve pool element 88 having spaced valve lands 90, 92, 94, 96 and 98. These valve lands register with internal valve lands formed in manual valve chamber 100.

A positive displacement pump 28 delivers output pressure to the manual valve through line pressure passage 102 and communicating passage 104, the latter communicating with the valve chamber 100 at a location intermediate the lands 92 and 94 when the valve element 88 assumes the position shown in FIG. 2. At that time lands 92 and 94 block distribution of pressure from the passage 104 through the manual valve.

Passage 102 communicates also with passage 106 of the main oil pressure regulator valve 76. This valve maintains a regulated pressure level in passage 106 and in line pressure passage 102. It includes a movable valve element 108 having spaced valve lands 110, 112 and 114. Valve element 108 is positioned in valve chamber 116 having internal valve lands that register with the valve lands of the valve element 108. A regulator valve spring 119 is positioned between a fixed sleeve 121 at one end of the valve chamber 116 and a spring seat that engages the valve element 108. A second valve spring 120 is interposed between the valve element 108 and the main oil pressure booster 122 situated slidably within the sleeve 121. Passage 106 communicates with the chamber 116 at a location intermediate the lands 110 and 112. Low pressure passage 124 communicates with the chamber 116 adjacent land 110. Pressure feedback passage 118 communicates with the upper side of the land 114. The exhaust passage 126 communicates with the chamber 116 intermediate the lands 112 and 114.

Upon a pressure increase in the passage 106, a pressure force acts on the valve 108 which opposes the force of the springs 119 and 120. The degree of communication between passage 124 and passage 106 increases at a time before land 112 uncovers the exhaust port leading to exhaust passage 126. Upon a further increase in the pressure in the passage 106, communication is established between passage 106 and exhaust passage 126 so that excess fluid can be bypassed to the transmission sump 128 defined by the lower portion of the transmission housing structure that encloses the torque delivery elements shown in FIG. 1.

Passage 124 acts as a feed passage for the torque converter 12. The outlet side of the torque converter 12 communicates with a cooler 130, which in turn distributes fluid on its discharge side to the lubrication circuit for the transmission. The fluid then is returned to the sump. Other lubrication points are supplied through the drain back valve 84 which is the one-way check valve that communicates with the inlet side of the converter 12. This valve closes the fluid flow path from the converter to the lubrication circuit when the vehicle engine is inactive, thereby preventing the fluid in the converter from exhausting through the drain back valve. The converter thus is maintained filled when the engine is inactive so that it is conditioned for immediate operation after the engine is restarted.

The line pressure coasting boost valve includes a movable valve spool 132 having valve lands 134 and 136. Valve spool 132 is urged in an upward direction, as viewed in FIG. 2, by valve spring 138. The area of land 136 is greater than the area of land 134. Passage 140, which normally is exhausted when the vehicle speed reaches a value greater than the speed at which the cutback control valve will be triggered, communicates with valve chamber 142 adjacent land 136. The element 132 is slidably positioned in chamber 142, the latter having internal lands that register with the lands 134 and 136.

Line pressure is supplied to the chamber 142 through passage 144. Land 134 restricts the degree of communication between passage 144 and outlet passage 146. The valve element 132 modulates the pressure in passage 144 to produce a resultant output pressure in passage 146, the value of which is determined by the calibration of the spring 138. Upon an increase in the value of the primary throttle valve pressure, the line pressure coasting boost valve is effective to decrease the modulated output pressure in passage 146. This is achieved by introducing primary throttle valve pressure to the upper side of the land 134 through passage 148. Valve 78 thus is effective to provide its maximum influence during coasting operation when the engine throttle is relaxed and the vehicle is coasting.

The output pressure in passage 146 is distributed across a two-way check valve 150 to the lower side of valve land 152 formed on valve element 122. If the pressure forces acting on the valve element 122 are sufficient to overcome the force of the spring 120, an increase in the regulated output pressure is obtained.

Valve element 122 is provided also with valve land 154 which is larger in diameter than the land 152, thus creating a differential pressure that is in fluid communication with reverse line pressure boost passage 155. This passage 155 is pressurized whenever the manual valve is conditioned for reverse drive operation. An increase in the pressure forces acting on the element 122, assuming that the force of spring 120 is overcome, would result in an increased line pressure.

A third valve land 156 having a diameter larger than the diameter of land 154 is formed on element 122. The differential area associated with lands 154 and 156 is in fluid communication with throttle pressure boost passage 158 which communicates with a primary throttle valve assembly to be described with reference to FIG. 2B. Throttle pressure is an indicator of engine manifold pressure which in turn is an indicator of engine torque. A change in engine torque thus will result in an increased line pressure whenever the pressure requirements exceed the minimum pressure maintained by the precalibrated springs 120 and 119.

Passage 160 communicates with the cut-back control valve. It normally is exhausted when the cut-back control valve is in its high speed position. When the cut-back control valve is in its low speed position, however, passage 160 is subjected to primary throttle valve pressure which is distributed to passage 162 extending to the lower side of the land 152. This throttle pressure complements the throttle pressure acting on the differential area of lands 154 and 156 so that the regulated line pressure during the initial acceleration period is higher than it is after the acceleration period reaches its terminal phase. The cut-back control valve pressure in passage 160 is distributed also to passage 164, which extends to the intermediate servo accumulator valve 80. The cut-back valve pressure in passage 164 renders the intermediate servo accumulator valve 80 operative. It will function, therefore, only at speeds that are less than the speeds at which the cut-back control valve assumes its high speed position.

Intermediate servo accumulator valve 80 includes a valve element 166 having spaced valve lands 168 and 170. A differential area is defined by the lands 168 and 170, which area is in communication with the passage 164. Valve spring 172 normally tends to urge the valve element 166 in an upward direction. When it assumes its upward position, valve element 166 will block communication between passages 174 and 176, both of which communicate with the chamber 178 within which the valve element 166 is slidably positioned. Passage 174 communicates with the release side of the intermediate servo illustrated in FIG. 2A and in FIG. 1. Passage 176 communicates with the direct-and-reverse clutch servo and is pressurized whenever that clutch servo is pressurized. One-way check valve 180 establishes one-way fluid communication between the passages 174 and 176. Pressure can be distributed from the direct-and-reverse clutch servo to the passage 174, but fluid flow in the opposite direction is prevented by the valve 180.

Passage 174 communicates with the upper side of land 170. When the passage 164 is pressurized, the accumulator valve establishes a restricted fluid flow path from the passage 174 to the passage 176 upon application of the intermediate servo. The degree of communication established by the intermediate servo accumulator is dependent upon the calibration of the spring 172. On a 1-2 upshift, which requires engagement of the intermediate servo, the release side of the intermediate servo acts as an accumulator. The fluid on that side of the servo must be exhausted through the restricted flow path provided by the intermediate servo accumulator. This delays the application of the intermediate servo to provide a cushioning action that prevents a rough 1-2 upshift. Torque capacity of the intermediate servo increases gradually until it is sufficient to accommodate the driving torque, at which time the overrunning brake 58 begins to freewheel.

On a 3-2 downshift, upon an increase in torque delivery, it is necessary to disengage the direct-and-reverse clutch servo and to exhaust the release side of the intermediate servo. Both the direct-and-reverse clutch and the release side of the intermediate servo are fed through a common feed circuit. Thus the direct-and-reverse clutch can be exhausted relatively quickly. The fluid that exists at that instant on the release side of the intermediate servo must be exhausted, however, through the intermediate servo accumulator. If such a downshift occurs while the cut-back control valve is in its low speed position, the resistance offered by the intermediate servo accumulator valve during accumulation action of the intermediate servo piston delays the application of the intermediate speed ratio brake. The direct-and-reverse clutch thus become disengaged momentarily before the intermediate servo has gained sufficient capacity to accommodate the driving torque. This causes the torque delivery elements to accelerate to a synchronous speed that is compatible with the rotary speed that is assumed following completion of the 3-2 downshift.

Ratio changes between the lowest speed ratio and the intermediate speed ratio are controlled by a 1-2 shift valve assembly 182. This includes valve elements 184 and 186, which are situated slidably in a common valve chamber 188. Valve element 184 has formed thereon valve lands 190 and 192 of differential area, the diameter of land 192 being the greater. Valve element 184 includes also valve lands 194 and 196 which also are formed with a differential area. Valve land 198 is located between lands 192 and 196.

Valve element 186 has valve land 200 which is subjected to line pressure. It communicates with governor pressure passage 202. Element 186 includes also a smaller valve land 204. The differential area defined by the lands 204 and 200 is in fluid communication with modulated throttle pressure passage 206. The pressure in the passage 206 delays a 1-2 upshift due to an increasing governor pressure in passage 202.

Line pressure is distributed to the 1-2 shift valve through line pressure feed passage 208, which communicates directly with the forward clutch. It communicates also with port 210 for the 1-2 shift valve assembly 182 at a location adjacent land 192. When the valve element 184 is positioned as shown, the line pressure maintains an upwardly directed hydraulic force on the valve element 184 due to the differential area of lands 190 and 192. Movement of the valve element 184 in a downward direction under the influence of governor pressure is opposed by the force of valve spring 212.

When shift valve element 184 is shifted in a downward direction, which corresponds to the position of the valve assembly, passage 208 is brought into fluid communication with passage 214 through the valve chamber 188. When the valve element 184 assumes its upward position, however, passage 214 is exhausted through exhaust port 216. Whenever passage 214 is pressurized, pressure is distributed to the apply side of the intermediate servo through the 2-3 back-out valve which will be described with reference to FIG. 2B.

When the manual valve 74 is moved to either the low or reverse positions, L or R respectively, passage 104 becomes connected to passage 218 through the manual valve and through crossover passage 220. The pressure in passage 218 then is distributed directly across the 1-2 shift valve assembly to passage 222, which in turn communicates with the lower end of land 190, which locks the valve element 184 in its upper position and prevents a 1-2 upshift. The transmission then is maintained in the low speed ratio drive condition. Passage 222 communicates with the passage 224, which extends to the reverse-and-low servo 64 through the low servo modulator valve to be described with reference to FIG. 2B.

The upper end of land 194 is subjected to the pressure in passage 226, which communicates with the manual valve chamber and which is pressurized whenever the manual valve assumes second speed ratio position No. 2. At that time passage 104 is brought into direct communication with passage 228 through the space between the lands 94 and 96 which in turn communicates directly with the passage 226 through the space between the lands 96 and 98. The valve element 184 of the 1-2 shift valve assembly now is urged to a downward or upshift position which causes the apply side of the intermediate servo to become energized as explained previously. The fluid displaced from the release side of the servo 66 at that time is distributed through the intermediate servo accumulator, as described previously, and through passage 176, which is in communication with the exhaust region through the shift valve assembly 230, through passage 232 and through passage 234, which is exhausted through the end of the manual valve chamber 100. Passage 234 communicates with the reverse line boost passage 155 described previously. It is pressurized when the manual valve assumes a reverse drive position, but it is exhausted at all other times. When the manual valve is in either the low or reverse position, passage 218 is pressurized, as explained previously. The pressure in this passage is distributed across to check valve 234 to passage 235 and then to the 2–3 shift valve assembly to urge the latter to a downshift position while the mechanism is conditioned for continuous operation in the low speed ratio. Passage 236 is exhausted at that time. This passage communicates with passage 238 which extends to the manual valve chamber 100. This passage is exhausted at all times except when the manual valve assumes a second speed ratio position.

If the manual valve is moved to the second speed ratio position and passage 238 is pressurized, passage 218 becomes exhausted. Thus passage 236 is brought into communication with passage 235 as the valve element 234 blocks passage 218.

The pressure that exists in passage 238 when the manual valve assumes the second speed ratio position urges the valve element 184 to its upshift position.

The 2–3 shift valve assembly 230 comprises a movable valve element 240 which has valve lands 242, 244, 246 and 248. Valve element 240 is urged normally in an upward direction by valve spring 250. Spring 250 acts also on the upper end of the throttle pressure modulator valve 252 situated with the valve element 240 in a common valve chamber 254.

Valve land 248 has a diameter that is greater than the diameter of the adjacent valve land 246. This defines a differential area that is in fluid communication with the passage 235. The force produced by the pressure acting on the differential area, as explained previously, maintains the 2–3 shift valve in its downshift position during operation in the intermediate speed ratio.

The 2–3 shift valve is fed with line pressure from passage 214 which, as explained previously, is pressurized whenever the 1–2 shift valve assembly assumes the upshift position. Passage 214 communicates directly with passage 256 through the flow restricting orifices indicated. When the valve element 240 is in the downshift position, land 242 blocks passage 256. When the valve element 240 assumes an upshift position, passage 256 is brought into direct fluid communication with passage 258 through the valve chamber 254. This upshift occurs under the influence of governor pressure acting on the upper end of land 248, which governor pressure is distributed to the land 248 through the previously described passage 202.

Line pressure is distributed to passage 260 from passage 102. Passage 260 communicates with the differential area defined by the lands 244 and 246, thereby opposing the influence of the governor pressure. When the valve element 240 shifts, however, the pressure acting on this differential area is exhausted through passage 232 thereby causing the valve element to move with a snap-action and introducing a hysteresis effect that causes a downshift to occur at a lower speed than the speed at which the corresponding upshift occurs for any given engine throttle setting and engine manifold vacuum.

Passage 260 communicates also with the throttle valve assembly to be described with reference to FIG. 2B. It serves as a line pressure feed passage for the throttle valve assembly.

When the valve element 240 assumes the position shown in FIG. 2A, passage 258 is exhausted through passage 232. A previously explained passage 232 is exhausted whenever the manual valve assumes any position other than the reverse drive position. A shift signal pressure is distributed to the lower end of the valve 252 through passage 262. The shift signal is obtained from the throttle pressure boost valve which will be described with reference to FIG. 2B. The magnitude of that signal is determined by the magnitude of the engine intake manifold pressure and is an indicator of engine torque demand. The pressure in passage 262 is modulated by the valve 252 to produce a resultant reduced output pressure in passage 206. The same pressure is distributed to the lower end of the land 242 thereby delaying the 2–3 upshift during acceleration by opposing the influence of the governor pressure in passage 202.

Upon an upshift to the high speed ratio position from the position shown in FIG. 2A, passage 258 is brought into fluid communication with passage 256, the former extending to the high speed ratio clutch. As fluid is fed under pressure to the high speed clutch 34, one-way check valve 264 produces a bypass flow path around orifice 266 located in the passage 258. This provides a rapid fill for the servo for the clutch 34. On a downshift when the high clutch becomes exhausted, valve 264 forces all the fluid exhausted from the clutch servo to pass through the orifice 266, thereby delaying the release of the clutch during a 3–2 downshift upon an increase in torque demand.

The cut-back control valve, to which reference was made in the preceding portion of this specification, is shown in FIG. 2B at 268. It includes a valve element 270 having spaced lands 272, 274 and 276. Valve element 270 is slidably situated in valve chamber 278. Primary throttle valve pressure is distributed to the chamber 278 through throttle pressure passage 280 which intersects the passage 278 at a location adjacent land 274. An upwardly directed force acts on the valve element 270 by reason of the differential area of lands 272 and 274. When the valve element 270 is shifted in a downward direction, this differential area is exhausted through the exhaust port 282 in the lower end of the valve chamber 278.

When the valve element 270 assumes the position shown, communication is established between passage 280 and passage 284 through the valve chamber 278.

Governor pressure is distributed to the upper end of the land 276, thereby causing it to move in a downward direction when the speed of the vehicle exceeds a precalibrated value for any given manifold pressure. At that time passage 284 becomes exhausted through passage 282 thereby exhausting the pressure on the lower side of the land 152 of the main oil pressure booster 86. This results in a decrease in the regulated pressure maintained by the regulator valve 76. When the valve element 270 assumes the position shown in FIG. 2C, the lower end of the main oil pressure booster 86 is pressurized. The output pressure of the throttle pressure booster valve, which is made available to the passage 262, is made available also to the chamber 278. Passage 286 communicates with passage 262 and distributes throttle pressure booster output pressure to the differential area 288 formed on the upper land of the valve element 270 to provide a delaying action for movement of the cut-back control valve during acceleration.

Passages 290 and 292 communicate with the chamber 278 at a location intermediate the lands 276 and 274 when the valve element 270 is positioned as shown. A bypass flow connected between the passage 290 and 292 is established at that time. On the other hand, when the valve element 270 is moved in a downward direction, communication between the passages 290 and 292 through the chamber 278 is interrupted. Passage 292 communicates directly with the previously described passage 174, which communicates with the release side of the intermediate servo. Passage 290 also communicates with the release side of the intermediate servo but it is connected to the passage 174 through a flow controlling orifice 294.

A one-way flow check valve 296 provides a bypass flow path around the orifice 294. It permits passage of fluid under pressure from passage 174 to passage 290, but it prevents flow of pressurized fluid in the opposite direction.

During a 3-2 downshift at low speeds, at which time the cut-back control valve assumes the position shown, the fluid that is displaced from the release side of the intermediate servo 66 as the servo 66 becomes applied, is passed through the bypass passage defined by the cut-back control valve. The fluid need not pass through the orifice 294. The intermediate servo accumulator valve, however, is active since the passage 164 is pressurized at that time. This occurs, as explained previously, whenever the cut-back control valve is in the position shown in FIG. 2C. All of the fluid displaced by the accumulating action of the intermediate servo piston thus passes through the restricted flow path defined by the accumulator valve element 166. The high speed ratio clutch 34 is exhausted directly through the 2-3 shift valve as explained previously. Thus delay in the application of the intermediate servo due to the accumulator action of the servo piston and the intermediate servo accumulator provides a sufficient delay between the clutch disengagement and the brake application to allow the torque delivery elements of the driveline to accelerate to a synchronous speed before the brake becomes applied with its full capacity.

When a 3-2 downshift occurs at a relatively high speed, at which time the cut-back control valve is in its downward position, the bypass flow passage between passages 290 and 292 through the cut-back control valve chamber is blocked. Similarly, the passage 284 is exhausted through the exhaust port 282. Since passage 284 is exhausted, passage 164 also is exhausted and this renders the intermediate servo accumulator valve ineffective. Fluid can pass directly, under these conditions, from the passage 174 to the passage 176 through the intermediate servo accumulator valve chamber. All the fluid displaced from the release side of the intermediate servo due to the accumulating action of the intermediate servo piston must pass at this time through the orifice 294. This delays the application of the intermediate speed ratio brake during the interval in which the high speed ratio clutch becomes disengaged. This also allows the high speed ratio clutch to slip before the intermediate speed ratio brake becomes fully effective.

The calibration of the orifice 294 can be done independently of the shift timing requirements for a 3-2 downshift at low vehicle speeds. At low speeds the interemdiate servo accumulator valve provides the necessary timing action between the clutch disengagment and the brake band application. This valve thus can be calibrated independently of the timing requirements that are necessary during a 3-2 downshift at high speeds.

The 2-3 back-out valve is shown at 298. It controls light throttle or zero throttle upshifts from the intermediate ratio to the high speed ratio following an initial acceleration period in an underdrive ratio. It includes a valve spool 300 having spaced valve lands 302, 304 and 306. It normally is urged in an upward direction, as viewed in FIG. 2B by valve spring 308. The apply side of the intermediate servo communicates with the chamber from the valve 298 through a passage 310. When the valve element 300 is positioned as shown, passage 310 communicates through the back-out valve 298 with passage 214, which extends to the high speed ratio clutch through the passage 256 and the 2-3 shift valve after the latter assumes its upshift position.

When the 2-3 shift valve moves from the position shown in FIG. 2A to its upshift position, passage 312 becomes pressurized since it communicates directly with passage 258. This tends to urge the valve spool 300 in a downward direction establishing comunication between passage 312 and passage 310.

Since the release side as well as the apply side of the servo 66 is pressurized, the servo is released. Both clutches being applied, the transmission then is conditioned for intermediate speed ratio operation. Throttle pressure exists on the lower side of the land 302 since it is distributed to the valve 298 through throttle pressure booster output passage 314, which communicates with the previously described passage 286.

If a 2-3 shift occurs with a relaxed throttle, a pressure build-up occurs in passage 312 as the high speed ratio clutch 34 gains capacity. This causes the valve element 300 to shift in a downward direction thereby connecting clutch 34 with theh apply side of the intermediate servo. The apply side of the intermediate servo experiences a pressure build-up which accompanies the pressure build-up on the high speed ratio clutch. Because of the fluid connection with the apply side of the servo 66 through the 2-3 back-out valve, the high speed ratio will assume a threshold pressure which will be sufficient to cause initial clutch engagement, but which will avoid full clutch engagement until the servo pressure on the apply side of the servo 66 begins to decay or the brake releases. The high speed ratio clutch thus engages with a cushioning action that is just sufficient to avoid slippage. After the intermediate servo piston has stroked fully and the accumulating action of the piston ceases, the forward clutch pressure then can be increased without any accompanying inertia forces due to a sudden change in angular velocity of the associated rotary components.

A 1-2 transition valve 316 is situated at the opening end of the valve chamber for the 2-3 back-out valve 298. It includes a single diameter valve element which is subjected at its upper end to the pressure in the reverse-and-low servo 64. Passage 318 communicates with the servo 64 and with the upper end of the 1-2 transition valve 316. Passage 318 in turn communicates with the feed passage 224 through the low servo modulator valve 320. Whenever the low-and-reverse servo 64 is applied, the 1-2 transition valve moves the valve element 300 in a downward direction, thereby blocking communication between passage 310 and passage 214. This prevents application of the intermediate servo 66 whenever the low speed ratio servo 64 is applied. It is not possible, therefore, for the two brake servos to become applied simultaneously when the operator moves the manual selector valve between the 1 position and the 2 position, both of which are indicated in FIG. 2.

The low servo modulator 320 includes a spool valve element 322 having lands 324 and 326 of differential area. Passage 328 communicates with the valve chamber for the modulator 320. The pressure in passage 224 is modulated by the valve element 322 and the resultant modulated pressure is distributed to passage 318 and to the servo 64, the degree of modulation being determined by the calibration of the spring 330 which opposes the force acting on the differential area of lands 324 and 326. The torque requirements of the servo 64 are less during low speed ratio operation than they are during reverse drive operation. The modulator 320 thus avoids a build-up of pressure during low speed ratio operation beyond that which is needed. During reverse drive, however, the passage 318 becomes connected to line pressure since it communicates with passage 234. As explained previously, this passage is pressurized whenever the manual valve is moved to the reverse position although it is exhausted at other times. Passage 328 communicates with the right hand side of the valve element 322 thereby interrupting the modulating action of the modulator 320 as a direct communication between passage 318 and passage 224 is established. Maximum pressure then is delivered to the servo 64 for accommodating the increased torque reaction that is experienced during reverse drive.

Throttle downshift valve 332 is effective to force downshifts. As the vehicle engine throttle is advanced to a wide opening setting, a mechanical throttle linkage for the engine throttle at that time strikes the end of valve element 334 and compresses the valve element 334 against the opposing force of spring 336. This establishes communication between throttle pressure passage 338 and kickdown pressure passage 340. This communication takes place through the valve chamber in which valve element 334 is slidably situated. Land 342 on the valve element 334 blocks the exhausted passage 344 at that time. Passage 344 communicates with the passage 235 to distribute pressure to the passage 340 when the manual valve is shifted to the low speed ratio position or the second speed ratio position.

The magnitude of the throttle pressure in passage 314 that exist at the time of kick-down is nearer the maximum line pressure. Thus both shift valves are forced to their downshift positions by the pressure in the passage 340.

A pressure signal that is proportional in magnitude to the engine intake manifold pressure is developed by a throttle valve assembly 346. This includes a movable valve element 348 which is biased in a left-hand direction by valve spring 350. This spring 350 is located in a manifold pressure chamber 352 which is defined in part by a movable diaphragm wall 354. The chamber 352 is connected to the engine intake manifold 26 through manifold pressure passage 356.

Line pressure is distributed from the pump 28 to the valve assembly 346 through passage 260, as explained previously. Valve 348 modulates that pressure and produces in passage 358 a pressure signal that is proportional in magnitude to the pressure in chamber 352. Diaphragm 354 is connected to valve element 348 through a valve stem 360. An exhaust port 362 is situated on one side of the output passage 358. The inlet port communicating with the passage 260 is located on the other side of the passage 358. An internal feed back passage 364 produces a force on the valve element 348 that opposes and balances the forces acting on the diaphragm 354.

The output pressure signal in passage 358 is distributed to throttle pressure booster 366. This includes valve spool 368 having lands 370 and 372 of differential diameter. Valve spring 374 acts directly on the element 368 to urge it in a right hand direction. Pressure supply passage 376 communicates with the chamber in which valve element 368 is located.

When the magnitude of the primary throttle valve pressure is less than a predetermined value determined by the calibration of the spring 374, direct communication is established between passage 358 and output pressure passage 314. As the engine throttle setting increases and the magnitude of the pressure in passage 358 increases accordingly, valve element 368 begins to modulate the pressure in passage 376 to produce a magnified pressure in output pressure passage 314. The output pressure signal in passage 314 is a more accurate indicator of torque demand than the pressure in the passage 358. The magnitude of the pressure in passage 358 does not change in proportion to carburetor throttle setting at advanced engine throttle position although it does provide a generally linear relationship between these two variables at low engine throttle settings. The output pressure signal in passage 314 thus is a more accurate indicator of torque demand and is useful therefore to establish shift points. The pressure in passage 358, however, is useful to establish a feed back to the main pressure regulator since it is a more accurate indicator of engine torque than is the pressure signal in passage 314. It is for this reason that passage 358 is connected directly to passage 158, which in turn extends to the main oil pressure booster.

To avoid an excessive pressure build-up by the pressure regulator due to a malfunction of the throttle valve assembly 346, a pressure limit valve 380 is provided. It communicates with passage 358. If the pressure in passage 358 exceeds a value corresponding to the maximum throttle pressure requirements of the system, valve 380 will open passage 358 to the exhaust region. If for some reason the pressure in the passage 358 were to approach a valve equal to the line pressure produced by the pump 28, that increased pressure would be distributed to the main oil pressure booster thereby causing an uncontrolled pressure increase due to the increased pressure regulating limits of the main oil pressure regulator. It might be possible with such a malfunction for the circuit pressure to rise to the maximum value that is capable of being produced by the pump 28.

The governor pressure signal used by the control circuit is developed by a governor valve assembly comprising a secondary governor 382 and a primary governor 384. The governor is supplied with line pressure through passage 386 which is pressurized whenever the forward clutch is pressurized. Passage 386, which is a feed passage for the governor, communicates directly with the passage 208 which extends to the forward clutch.

The governor acts under the influence of centrifugal force to modulate the pressure in the passage 286 and produce a resultant pressure in passage 202 that is an indicator of the speed of rotation of the output shaft 52. The modulating action of the secondary governor is interrupted, however, by the primary governor as the latter blocks cross-over passage 388, which communicates directly with exhaust port 390 formed in the secondary governor 382.

Having thus described a preferred embodiment of our invention, what we claim and desire to secure by U.S. Letters Patent is:

We claim:

1. In a control system for an automatic power transmission mechanism adapted to deliver torque from a driving member to a driven member, multiple ratio gearing forming multiple torque delivery paths extending between said driving member and said driven member, clutch and brake means for controlling the relative motion of the elements of the said gearing to initiate speed ratio changes including an underdrive speed ratio brake for anchoring a reaction element of said gearing, a fluid pressure operated servo for said brake including a pressure operated piston having a pressure chamber on either side of said piston, said servo being applied when one pressure chamber is pressurized and said servo being released when the other pressure chamber is pressurized, a source of control pressure, conduit structure connecting said pressure source to said servo and said clutch and brake means including shift valve means for selectively pressurizing said clutch and brake means and the working chambers of said servo, a first calibrated flow restricting means in the portion of said conduit structure extending to the release side of said servo, a second flow restricting means communicating with said conduit structure portion, a source of a speed signal that is proportional in magnitude to the driven speed of said driven member, and a bypass flow passage in parallel disposition with respect to said first flow restricting means and speed sensitive valve means in communication with said governor and with said bypass passage and responsive to said speed signal for blocking said bypass flow passage at relatively high driven speeds of said driven member whereby the rate of application of said servo is altered during operation at speeds greater than a predetermined speed range in comparison to the corresponding rate of application during operation at lower speeds.

2. In a control system for an automatic power transmission mechanism adapted to deliver torque from a driving member ot a driven member, multiple ratio gearing foring multiple torque delivery paths extending between said driving member and said driven member, clutch and brake means for controlling the relative motion of the elements of the said gearing to initiate speed ratio changes including an underdrive speed ratio brake for anchoring a reaction element of said gearing, a fluid pressure operated servo for said brake including a pressure operated piston having a pressure chamber on either side of said piston, said servo being applied when one pressure chamber is pressurized and said servo being released when the other pressure chamber is pressurized, a source of control pressure, conduit structure connecting said pressure source to said servo and said clutch and brake means including shift valve means for selectively pressurizing said clutch and brake means and the working chambers of said servo, a first calibrated flow restricting means in the portion of said conduit structure extending to the release side of said servo, a second flow restricting means communicating with said conduit structure portion, a source of a speed signal that is proportional in magnitude to the driven speed of said driven member, a bypass flow passage in parallel disposition with respect to said first flow restricting means and speed sensitive valve means in communication with said governor and with said bypass passage and responsive to said speed signal for blocking said bypass flow passage at relatively high driven speeds of said driven member whereby the rate of application of said servo is altered during operation at high speeds in comparison to the corresponding rate of application during operation at lower speeds, a fluid connection between said speed sensitive valve means and said flow restricting means, a source of a second pressure signal, and a connection between said second pressure signal source and said speed sensitive valve means, said speed sensitive valve means establishing and interrupting fluid communication between said flow restricting orifice and said second pressure signal source whereby said flow restricting orifice is bypassed when said speed sensitive valve means is actuated to its high speed condition.

3. In a control system for an automatic power transmission mechanism adapted to deliver torque from a driving member to a driven member, multiple ratio gearing forming multiple torque delivery paths extending between said driving member and said driven member, clutch and brake means for controlling the relative motion of the elements of the said gearing to initiate speed ratio changes including an underdrive speed ratio brake for anchoring a reaction element of said gearing, a fluid pressure operated servo for said brake including a pressure operated piston having a pressure chamber on either side of said piston, said servo being applied when one pressure chamber is pressurized and said servo being released when the other pressure chamber is pressurized, a source of control pressure, conduit structure connecting said pressure source to said clutch and brake means including shift valve means for selectively pressurizing said clutch and brake means and the working chambers of said servo, a first calibrated flow restricting means in the portion of said conduit structure extending to the release side of said servo, a second flow restricting means communicating with said conduit structure portion, a source of a speed signal that is proportional in magnitude to the driven speed of said driven member, and a bypass flow passage in parallel disposition with respect to said first flow restricting means and speed sensitive valve means in communication with said governor and with said bypass flow passage and responsive to said speed signal for blocking said bypass passage at relatively high driven speeds of said driven member whereby the rate of application of said servo is altered during operation at speeds greater than a predetermined speed range in comparison to the corresponding rate of application during operation at lower speeds, a fluid connection between said speed sensitive valve means and said flow restricting means, a source of a second pressure signal, a connection between said second pressure signal source and said speed sensitive valve means, said speed sensitive valve means establishing and interrupting fluid communication between said second flow restricting means and said second pressure signal source whereby said second flow restricting means is rendered inactive when said speed sensitive valve means is actuated to its high speed position, and one-way flow check valve means in parallel disposition with respect to said first flow restricting means for accommodating pressure distribution from said pressure source to said release side of said servo but preventing flow therethrough in the opposite direction.

4. In a power transmission mechanism having fluid pressure operated servos adapted to control speed ratio changes as torque is delivered from a driving member of said mechanism to a driven member of said mechanism, a pressure source, conduit structure connecting said pressure source and said servos, one of said servos comprising a double-acting brake piston, a pair of pressure chambers defined in part by said brake piston on either side thereof, one pressure chamber being pressurized to effect movement of said piston to a brake applying position, the other pressure chamber being pressurized to effect movement of said piston to a brake releasing position, shift valve means in said conduit structure for controlling distribution of pressure to said servos and to said pressure chambers of said one servo, a pressure feed passage communicating with said other chamber and forming a part of said conduit structure, the fluid in said other chamber being exhausted through said feed passage as said piston is stroked upon application of pressure to said one chamber to a brake release position, a low speed timing valve communicating with said feed passage and forming a flow restriction therein including a movable valve element, a valve chamber containing said movable valve element, a signal passage communicating with said valve chamber and adapted to control distribution of a pressure signal to said movable valve element to cause the latter to move toward a feed passage restricting position during speed ratio changes at low speeds, a calibrated flow control orifice in said feed passage, a bypass passage means in parallel disposition with respect to said flow control orifice, a speed responsive valve means communicating with said bypass passage means and with said signal passage and partly defining the same, said speed responsive valve means including a two-position valve element adapted to assume a first position which opens said bypass passage means, a source of a pressure signal that is related to the speed of said driven member, and a connection between said speed signal source and said speed responsive valve means, said speed responsive valve means responding to an increase in speed of said driven member by moving to its second operating position whereby said bypass passage means is blocked and the pressure in said signal passage means is altered.

5. In a power transmission mechanism having fluid pressure operated servos adapted to control speed ratio changes as torque is delivered from a driving member of said mechanism to a driven member of said mechanism, a pressure source, conduit structure connecting said pressure source and said servos, one of said servos comprising a double-acting brake piston, a pair of pressure chambers defined in part by said brake piston on either side thereof, one pressure chamber pressurized to effect movement of said piston to a brake applying position, the other pressure chamber being pressurized to effect movement of said piston to a brake releasing position, shift valve means in said conduit structure for controlling distribution of pressure to said servos and to said pressure chambers of said one servo, a pressure feed passage communicating with said other chamber and forming a part of said conduit structure, the fluid in said other chamber being exhausted through said feed passage as said piston is stroked upon application of pressure to said one chamber to a brake release position, a low speed timing valve communicating with said feed passage and forming a flow restriction therein, including a movable valve element, a valve chamber containing said movable valve element, a signal passage communicating with said valve chamber, a calibrated flow control orifice in said feed passage, a bypass passage means in parallel disposition with respect to said flow control orifice, a speed responsive valve means communicating with said bypass passage means and with said signal passage means and partly defining the same, said speed responsive valve mean including a movable valve element adapted to assume a first position which opens said bypass passage means and said signal passage means, a source of a pressure signal that is related to the speed of said driven member, a connection between said speed signal source and said speed responsive valve means, said speed responsive valve means responding to an increase in speed of said driven member by moving to its second operating position whereby said bypass passage means is blocked and the pressure in said signal passage means is exhausted, and a throttle valve means communicating with said pressure source for modulating the pressure of said source to produce a signal pressure that is related in magnitude to the torque applied to said driving member, said signal passage communicating with said throttle valve means through said speed responsive valve means at relatively low operating speeds as said bypass passage means is opened through said speed responsive valve means.

6. The combination as set forth in claim 1 wherein one servo is applied to establish an intermediate speed ratio drive condition, said clutch and brake means having fluid pressure operated servos for actuating them, two other of said servos being applied simultaneously to establish a high speed ratio condition, said one servo being applied upon a ratio change from said high speed ratio to said intermediate speed ratio as fluid is exhausted from said other pressure chamber thereby delaying the establishment of said intermediate ratio as said one servo loses torque capacity, the rate of application of said one servo being delayed by said first flow restricting means during ratio changes at high speeds and said second flow restricting means introducing a different calibrated time delay during application of said one servo at lower operating speeds at which time said speed sensitive valve means assumes its low speed position.

7. The combination as set forth in claim 2 wherein one servo is applied to establish an intermediate speed ratio drive condition, said clutch and brake means having fluid pressure operated servos for actuating them, two of the servos being applied simultaneously with said other servo to establish a high speed ratio condition, said one servo being applied upon a ratio change from said high speed ratio to said intermediate speed ratio as fluid is exhausted from said other pressure chamber thereby delaying the establishment of said intermediate ratio as said one servo loses torque capacity, the rate of application of said one servo being delayed by said flow restricting means during ratio changes at high speeds and said flow restricting orifice introducing a different calibrated time delay during application of said one servo at lower operating speeds and at which time said speed sensitive valve means assumes its low speed position.

8. The combination as set forth in claim 3 wherein one servo is applied to establish an intermediate speed ratio drive condition, said clutch and brake means having fluid pressure operated servos for actuating them, two other of said servos being applied simultaneously to establish a direct drive condition, said one servo being applied upon a ratio change from said direct drive to said intermediate speed ratio as fluid is exhausted from said other pressure chamber thereby delaying the establishment of said intermediate ratio as said one servo loses torque capacity, the rate of application of said one servo being delayed by said first flow restricting means during ratio changes at high speeds and said second flow restricting means introducing a different calibrated time delay during application of said one servo at lower operating speeds at which time said speed sensitive valve means assumes its low speed position.

9. The combination as set forth in claim 4 wherein one servo is applied to establish an intermediate speed ratio drive condition, said clutch and brake means having other fluid pressure operated servos for actuating them, two of the other servos being applied simultaneously to establish a high speed ratio condition, said one servo being applied upon a ratio change from said high speed ratio to said intermediate speed ratio as fluid is exhausted from said other pressure chamber thereby delaying the establishment of said intermediate ratio as said one servo loses torque capacity, the rate of application of said one servo being delayed by said flow restricting means during ratio changes at high speeds and said flow restricting orifice introducing a different calibrated time delay during application of said one servo at lower operating speeds and at which time said speed sensitive valve means assumes its low speed position.

10. The combination as set forth in claim 5 wherein one servo is applied to establish an intermediate speed ratio drive condition, said clutch and brake means having other fluid pressure operated servos for actuating them, two other of said servos being applied simultaneously with said other servo to establish a direct drive condition, said one servo being applied upon a ratio change from said direct drive condition to said intermediate speed ratio as fluid is exhausted from said other pressure chamber thereby delaying the establishment of said intermediate ratio as said one servo loses torque capacity, the rate of application of said one servo being delayed by said first flow restricting means during ratio changes at high speeds and said second flow restricting means introducing a different calibrated time delay during application of said one servo at lower operating speeds at which time said speed sensitive valve means assumes its low speed position.

References Cited

UNITED STATES PATENTS

| | | | |
|---|---|---|---|
| 3,354,752 | 11/1967 | General et al. | 74—763 |
| 3,400,612 | 9/1968 | Pierce, Jr. | 74—869 X |
| 3,446,098 | 5/1969 | Searles | 74—869 |

ARTHUR T. McKEON, Primary Examiner

U.S. Cl. X.R.

74—864

UNITED STATES PATENT OFFICE
CERTIFICATE OF CORRECTION

Patent No. 3,613,484　　　　　Dated October 19, 1971

Inventor(s)　　　　S. L. Pierce et al

It is certified that error appears in the above-identified patent and that said Letters Patent are hereby corrected as shown below:

Column 17, line 16, cancel "one" and substitute --said first mentioned--; line 19, after "them" and before the comma, insert --including said first mentioned servo--; line 21, cancel "one" and substitute --first mentioned--; line 25, cancel "as said one servo loses"; line 26, cancel "torque capacity"; line 26, cancel "one" and substitute --first mentioned--; line 30, cancel "one" and substitute --first mentioned--.

Column 17, line 33, cancel "one" and substitute --said first mentioned--; line 36, after "them" and before the comma, insert --including said first mentioned servo--; line 37, cancel "with said other servo"; line 38, cancel "one" and substitute --first mentioned--; line 42, cancel "as said one servo"; line 43, cancel "loses torque capacity"; line 43, cancel "one" and substitute --first mentioned--; line 47, cancel "one" and substitute --first mentioned--; line 48, cancel "and".

UNITED STATES PATENT OFFICE
CERTIFICATE OF CORRECTION

Patent No. 3,613,484                   Dated   October 19, 1971

Inventor(s)            S. L. Pierce et al        - 2 -

It is certified that error appears in the above-identified patent and that said Letters Patent are hereby corrected as shown below:

Column 17, line 50, cancel "one" and substitute --said first mentioned--; line 53, after "them" and before the comma, insert --including said first mentioned servo--; line 55, cancel "one" and substitute --first mentioned--.

Column 18, line 3, cancel "as said one servo loses torque capacity"; line 4, cancel "one" and substitute --first mentioned--; line 8, cancel "one" and substitute --first mentioned--.

Column 18, line 11, cancel "one" and substitute --said first mentioned--; line 14, after "them" and before the comma, insert --including said first mentioned servo--; line 16, cancel "one" and substitute --first mentioned--; line 20, cancel "as said one servo loses torque"; line 21, cancel "capacity"; line 21, cancel "one" and substitute --first mentioned--; line 25, cancel "one" and substitute --first mentioned--.

Column 18, line 27, insert --said-- after the word "wherein"; line 29, after "having" insert --also--; line 31,

UNITED STATES PATENT OFFICE
CERTIFICATE OF CORRECTION

Patent No. 3,613,484         Dated October 19, 1971

Inventor(s)       S. L. Pierce et al      - 3 -

It is certified that error appears in the above-identified patent and that said Letters Patent are hereby corrected as shown below:

cancel "other"; same line, after "said" insert --other--;

same line, cancel "with"; line 32, cancel "said other servo";

line 37, cancel "as said one servo loses torque capacity".

Signed and sealed this 3rd day of April 1973.

(SEAL)
Attest:

EDWARD M. FLETCHER, JR.                ROBERT GOTTSCHALK
Attesting Officer                      Commissioner of Patents

UNITED STATES PATENT OFFICE
CERTIFICATE OF CORRECTION

Patent No. 3,613,484              Dated October 19, 1971

Inventor(s)  S. L. Pierce et al

It is certified that error appears in the above-identified patent and that said Letters Patent are hereby corrected as shown below:

Column 3, line 31, cancel "no" and substitute --less--.

Column 12, line 13, after "ratio" insert --servo--.

Column 16, line 19, cancel "release" and substitute --apply--; line 62, cancel "release" and substitute --apply--; line 72, cancel "mean" and substitute --means--.

Signed and sealed this ?th day of April 1975.

(SEAL)
Attest:

RUTH C. MASON
Attesting Officer

C. MARSHALL DANN
Commissioner of Patents
and Trademarks